UNITED STATES PATENT OFFICE.

COLIN M. THOMPSON, OF BROOKLYN, AND ORAZIO LUGO, OF NEW YORK, N. Y.

PROCESS OF CURING INDIA-RUBBER.

SPECIFICATION forming part of Letters Patent No. 359,907, dated March 22, 1887.

Application filed June 11, 1886. Serial No. 204,869. (No specimens.)

*To all whom it may concern:*

Be it known that we, COLIN M. THOMPSON and ORAZIO LUGO, citizens of the United States, residing, respectively, at Brooklyn, in the county of Kings and State of New York, and New York, county of New York, and State of New York, have invented certain new and useful Improvements in Processes of Curing India-Rubber; and we do hereby declare the following to be a full, clear, and exact description of the invention, such as will enable others skilled in the art to which it appertains to make and use the same.

This invention relates to processes for manufacturing and curing india-rubber for the insulation of electrical wires.

Heretofore considerable time has been required to cure and to get crude india-rubber into proper plastic condition for manufacture. The most universally-practiced method of preparing the product is by washing or boiling it in an alkaline solution, then grinding and at the same time washing with water, laminating, and, finally, hanging in hot rooms to cure. The time required to cure or dry india-rubber by this method varies from three to six months, according to the kind and quality of the rubber treated, and then the product is not sufficiently plastic for covering wires.

The object of the present invention is to cure virgin or freshly-collected india-rubber in a short space of time, and render it fit for use immediately in the art of manufacturing india-rubber insulated electrical wires, and thus greatly saving time and expense.

With this object in view the invention resides in the process of treating virgin or freshly-collected india-rubber, consisting in working or masticating the same with hot rollers or calenders, and adding lamp-black to the product while being thus treated.

In order that the process may be clearly understood and others skilled in the art enabled to practice it, we will now minutely define the procedure by which the object of the invention is attained.

The rubber is first entirely freed from dirt, wood, or other foreign substances adhering to the outside by washing with hot water, or in any other suitable manner. It is then cut into pieces weighing, preferably, from one to two pounds each. A suitable number of pieces are then worked with a heated grinder or rollers for about half an hour. By this time the free water will have evaporated and the rubber become somewhat plastic. At this stage of the operation a quantity of lamp-black is to be added and the process of mastication continued until the admixture of the rubber and lamp-black becomes perfect and plastic.

The amount of lamp-black which is necessary to cure the virgin rubber depends on the quality of the rubber. Para rubber requires the most and Central American rubbers the least. The proportion of lamp-black to that of the rubber may vary from five (5) to twenty (20) per cent.

The new article produced by the admixture of rubber and lamp-black, when treated by the process above described, will be ready to undergo further treatment, if desired, such as the addition of sulphur or vulcanizive agents, or mixed in any desired proportions with shoddy, and can be immediately rendered into the finished article and ready for use.

It has been found that the mixture of rubber and lamp-black, prepared in the manner herein set forth, is most valuable for the covering or the insulating of electrical conductors or wires. When used for this purpose, it should be applied when still in a plastic condition—that is, soon after it comes from the hot rollers.

The compound will "set" soon after being applied, retaining the desired elasticity—a property much wanted for the covering of wires which have to be handled often and drawn in tubes under ground.

The covering of electrical conductors is only one of the many uses to which the compound may be applied.

By the process herein described virgin rubber may be cured and rendered fit for covering wires within an hour's time.

Having thus described our invention, what we claim, and desire to secure by Letters Patent, is—

1. The herein-described process of curing rubber, consisting in subjecting the same to the action of hot rollers, adding lamp-black, and then continuing the action of the rollers, substantially as described.

2. The herein-described process of curing rubber, consisting in subjecting the same to the action of hot rollers, adding from five to twenty per cent. of lamp-black, and then continuing the action of the rollers.

3. As a new article of manufacture, a compound consisting of rubber and lamp-black, in about the proportions set forth.

In testimony whereof we affix our signatures in presence of two witnesses.

COLIN M. THOMPSON.
ORAZIO LUGO.

Witnesses:
GROSVENOR S. HUBBARD,
HENRY B. SHEPARD.